United States Patent [19]

Tomibe et al.

[11] 4,410,593

[45] Oct. 18, 1983

[54] ELECTRICALLY CONDUCTING FIBER AND METHOD OF MAKING SAME

[75] Inventors: Shinji Tomibe, Kyoto; Reizo Gomibuchi, Uji; Kiyofumi Takahashi, Yawata, all of Japan

[73] Assignee: Nihon Sanmo Dyeing Co., Ltd., Kyoto, Japan

[21] Appl. No.: 183,639

[22] Filed: Sep. 3, 1980

[30] Foreign Application Priority Data

Mar. 5, 1980 [JP] Japan ................................ 55-28386

[51] Int. Cl.[3] ............................................ B32B 27/00

[52] U.S. Cl. .................................... 428/389; 428/394; 428/549; 428/560; 428/933

[58] Field of Search ............... 428/389, 394, 549, 560, 428/933

[56] References Cited

U.S. PATENT DOCUMENTS

| | | | |
|---|---|---|---|
| 2,743,991 | 5/1956 | Schoonoves et al. | 8/624 |
| 2,779,726 | 1/1957 | Rochester et al. | 8/624 |
| 3,014,818 | 12/1961 | Campbell | 117/227 |
| 3,416,874 | 12/1968 | Robin | 8/624 |
| 3,790,341 | 2/1974 | Makhkamov et al. | 8/624 |
| 3,940,533 | 2/1976 | Arsac | 428/389 X |
| 3,958,066 | 5/1976 | Imamura et al. | 428/372 |
| 4,122,143 | 10/1978 | Momotari et al. | 264/104 |

FOREIGN PATENT DOCUMENTS

| | | |
|---|---|---|
| 74056 | 1/1893 | Fed. Rep. of Germany . |
| 644429 | 6/1928 | France . |
| 1372656 | 11/1974 | United Kingdom . |
| 1396072 | 5/1975 | United Kingdom . |

*Primary Examiner*—John D. Smith
*Assistant Examiner*—Richard Bueker
*Attorney, Agent, or Firm*—Fisher, Christen & Sabol

[57] ABSTRACT

Electrically conducting acrylic and modacrylic fibers are prepared by subjecting the fibers to a first heat-treatment in a bath containing a copper compound and a reducing agent to adsorb monovalent copper ions within the fibers. The heat-treated fibers are washed thoroughly and then subjected to a second heat-treatment in the presence of a sulfur-containing compound to convert the adsorbed monovalent copper ions to copper sulfide. The electrically conducting fibers have superior conductivity which is not lost in repeated washings. The electrically conductive fibers can be dyed readily with cationic dyes without loss of electrical conductivity. The electrically conductive fibers of the present invention possess the touch and other physical characteristics of the starting acrylic or modacrylic fibers.

12 Claims, No Drawings

ELECTRICALLY CONDUCTING FIBER AND METHOD OF MAKING SAME

BACKGROUND OF THE INVENTION

1. Field Of The Invention

This invention relates to electrically conducting acrylic fibers and electrically conducting modacrylic fibers and to methods of making them.

2. Description Of The Prior Art

Numerous methods for imparting electrical conductivity to synthetic polymeric fibers are known in the art. For example, one method for imparting electrical conductivity to polymeric fibers involves plating the surface of the fiber. However, this method requires etching of the surface of the fiber prior to plating so as to obtain satisfactory adhesion. The process also involves sensitizing and activating the fiber prior to plating. In addition, the resulting electrically conducting fiber differs greatly from the starting fiber in softness, flexibility and smoothness.

In another prior art process, metal is kneaded into a polymer. The polymer is then spun into a yarn. However, this process is plagued by problems such as clogging of the nozzle with metallic particles during spinning. In addition, unless the metal content of the fibers is kept relatively low, the electrically conducting fiber obtained by this prior art method has inferior mechanical properties compared to the starting fiber.

In the third prior art process, metallic powder is deposited in the pores of a polymeric fiber. This method usually requires an extraordinarily porous fiber and intricate process steps.

In U.S. Pat. Nos. 3,014,818 and 4,122,143 electrically conductive products are produced by reducing a copper compound to metallic copper. In U.S. Pat. No. 3,014,818, an electrically conductive fibrous material is produced by soaking the fiber, such as cotton or acrylic fibers, in a bath comprising a reducible salt of nickel, cobalt, copper, or iron. The fiber is then subjected to a reducing treatment to obtain free metal particles which are dispersed through the interior of the fiber. Sodium borohydride and hydroxylamine are disclosed as satisfactory reducing agents. In U.S. Pat. No. 4,122,143, cured products are obtained by reducing copper simultaneously with the curing of a resin. Imparting electrical conductivity to an already existing fiber is not disclosed.

In the above-described prior art processes, electrical conductivity is obtained by the presence of metallic copper in the polymeric material. However, it is well-known that acrylic or acrylic-series fibers, including modacrylic fibers, have a strong affinity for monovalent copper ions. It is believed that this results from coordinate bonding between the cyanic groups in the fiber and the monovalent copper ions. The adsorption of monovalent copper ions into acrylic or acrylic-series fibers, including modacrylic fibers, turns the fibers yellowish. However, as determined by measurements of electrical resistance, etc., the fibers do not develop any electrical conduction at all.

According to the present invention there is provided an electrically conducting fiber having superior electrical conducting properties and superior washability. The electrically conducting fibers of the present invention are produced without the necessity of special pretreatments of the starting fibers. The present invention provides a method for converting monovalent copper ions which have been adsorbed by acrylic or acrylic-series fibers, including modacrylic fibers, into cuprous or cupric sulfide so as to impart electrical conductivity to the fibers.

SUMMARY OF THE INVENTION

Electrically conducting fibers having superior conductivity which is not lost in repeated washings are obtained without the need for special pretreatment of the fibers. The electrically conductive fibers of the present invention comprise acrylic or acrylic-series fibers, including modacrylic fibers, which have been impregnated with cuprous sulfide or cupric sulfide. In the process of the present invention, an acrylic or an acrylic-series fiber, including modacrylic fiber, is heat-treated in a bath containing monovalent copper ions so that the fiber adsorbs the monovalent copper ions. The fiber is then heat-treated with a sulfur-containing compound to convert the adsorbed monovalent copper ions into cuprous sulfide or cupric sulfide. The touch and other physical characteristics of the starting acrylic or modacrylic fiber is preserved in the process of the present invention. In addition, the electrically conductive fibers of the present invention can be dyed by cationic dyes.

DETAILED DESCRIPTION OF THE INVENTION

In the first stage of the process of the present invention, the acrylic or acrylic-series fibers, including modacrylic fibers, are heat-treated in a bath containing a copper compound and a reducing agent at a temperature of from about 90° C. to about 110° C. so that monovalent copper ions are absorbed by the fibers. The bath can optionally contain an acid or an acid salt for adjusting the pH of the bath. Suitable acids and salts for this purpose are sulfuric acid, hydrochloric acid, and salts thereof. Suitable pH values are in the range of from about 1.5 to about 2.0.

Suitable copper compounds which provide monovalent copper ions for adsorption by the fibers are cupric salts, such as cupric sulfate, cupric chloride, and the like and chelate compounds of copper, and the like. Suitable reducing agents for inclusion in the bath are metallic copper, hydroxylamine, ferrous sulfate, ammonium vanadate, furfural, and the like.

The bath temperature is preferably in the range from 90° C. to 110° C. so as to efficiently adsorb the monovalent copper ions and to maintain the strength of the fibers. At temperatures below 90° C., it takes many hours for the adsorption process. At temperatures over 110° C., the strength of the fibers drops.

The greater the quantity of copper ions adsorbed by the fiber, the better the electrical conductivity of the product fibers. However, if the copper ion content is too high physical properties, such as fiber strength, are reduced. On the other hand, satisfactory electrical conductivity properties cannot be obtained at very low copper ion contents. In the practice of the present invention, the amount of monovalent copper ions to be adsorbed by the fiber should be from 1 to 30% by weight (expressed in terms of the weight of metallic copper) based upon the weight of the starting fiber.

In the first stage of the process of the present invention, the acrylic or acrylic-series fibers having adsorbed monovalent copper ions become yellowish. However, the fibers do not possess any electrical conductivity at all. Electrical conductivity is imparted to the fibers in the second stage of the process of the present invention. In the second stage of the process of the present invention, the acrylic or acrylic-series fibers including modacrylic fibers having adsorbed monovalent copper ions are thoroughly scoured or washed with water. The washed fibers are heat-treated in a liquid or gas which comprises a sulfur-containing compound which is capable of reacting with the adsorbed monovalent copper ions to produce cuprous sulfide or cupric sulfide. The cuprous sulfide or cupric sulfide is adsorbed into the fibers thereby imparting excellent electrical conductivity properties to the fibers. The weight percentage of cupric sulfide or cuprous sulfide in the electrically conducting fiber expressed in terms of the weight of metallic copper is about 1% to 30% based upon the weight of the starting fiber.

Suitable sulfur-containing compounds for converting the monovalent copper ions into adsorbed cuprous or cupric sulfide are sodium sulfide, sulfur dioxide, sodium hydrogen sulfite, sodium pyrosulfite, sulfurous acid, dithionous acid, sodium dithionite, sodium thiosulfate, thiourea dioxide, hydrogen sulfide, and the like and mixtures thereof. The liquid which contains the sulfur-containing compounds is generally water and can include an acid or an acid salt for adjusting the pH values. Suitable acids and acid salts useful in the process of the present invention are sulfuric acid, sodium acetate, hydrochloric acid, and the like. The pH range is typically between about pH 5.5 to pH 6.0.

The heat-treatment temperature in the second stage of the process of the present invention is preferably more than about 50° C. Heat-treatment temperatures below 50° C. do result in the production of cuprous or cupric sulfide and impart electrical conductivity to the fibers. However, many hours are needed to accomplish this at these low temperatures. Suitably, the heat-treating in the second stage of the process of the present invention is at temperatures above from about 80° C. to about 105° C. for about 1 hour.

After the second heat-treating step, the electrically conducting fiber is washed thoroughly with water, for example, and then dried.

Electrically conducting fibers obtained by the process of the present invention were analyzed by X-ray defraction techniques for the determination of the crystal structure of the adsorbed copper sulfide. It was ascertained that the copper sulfide was adsorbed within the fibers in the form of digenite (empirical formula: $Cu_9S_5$).

Adsorption of the cuprous sulfide or cupric sulfide within the whole fiber results in a fiber which possesses excellent electrical conductivity and washability. Furthermore, the touch and physical properties of the starting fiber is substantially preserved in the process of the present invention. In addition, the electrically conducting fibers of the present invention can be dyed with cationic dyes. Electrically conducting fibers produced by the metal plating method cannot be dyed. Typically, the electrically conducting fibers of the present invention are dyed in an aqueous solution containing the cationic dye at a temperature of about 100° C. for about 30 minutes to 1 hour.

The electrically conducting fiber of the present invention lends itself to numerous applications in many fields. It can be used alone or in combination with other fibers to produce woven or knitted fabrics for electric blankets, electrically heated clothing and the like. Excellent control over the electrical properties of knitted or woven goods is obtained by combining the electrically conductive fibers of the present invention with other nonconductive synthetic fibers. For example, a small amount of the electrically conductive fibers of the present invention can be mingled into knitted or woven goods in the form of filament fibers. Also, spun yarns can be produced from mixtures of the electrically conductive fibers of the present invention with other synthetic fibers which are both in the form of staple fibers.

The invention is illustrated but not limited by the following examples in which all parts, percentages, and proportions are by weight unless otherwise indicated.

Example 1

Cashmilon (acrylic fiber, 2 deniers, 51 millimeters in length of cut, type FWBR, made by Asahi Chemical Industry Co., Ltd., Japan) was heat-treated in an aqueous bath containing 30 wt. % of cupric sulfate, 4 wt. % of sulfuric acid, and 80 wt. % of copper net (No. 31, of a 12-mesh) in relation to the weight of the fiber in the bath. The weight ratio of the fiber weight to water weight containing the chemicals was 1:15. The heat-treatment was at a temperature of 95° C. for 60 minutes. Subsequently, the fiber was thoroughly washed in water. Next, the washed fiber was again heat-treated in an aqueous solution containing 10 grams of Rongalite C ($NaHSO_2.CH_2O.2H_2O$) and 1 milliliter of sulfuric acid in relation to 1 liter of water, at a temperature of 80° C. for 60 minutes. The electrically conducting fiber was dried after being washed in water for a second time. It had an olive-grey color, and contained 12.3% by weight of copper sulfide in relation to the weight of the starting fiber. Its electrical resistivity was 0.085 ohm.centimeter. The crystal structure of this electrically conducting fiber was analyzed by X-ray diffraction. The line of diffraction (interfacial distance: 1.97Å, 3.21Å, 2.79Å) was of digenite (empirical formula: $Cu_9S_5$).

When this electrically conducting fiber was subjected to the repeated washing test ten times according to Japanese Industrial Standards L-1045, A-2, its electrical resistivity was 0.090 ohm.centimeter, and its washability was excellent.

This electrically conducting fiber was treated in an aqueous solution containing 2% by weight of sumiacryl Brilliant Red N-4G (cationic dye, made by Sumitomo Chemical Industry Co., Ltd., Japan) in relation to the fiber weight at a temperature of 100° C. for 30 minutes. It was splendidly dyed a dark-red color without deterioration of its conductivity.

EXAMPLE 2

Example 1 was repeated except Rongalite Z ($ZnSO_2.CH_2O.H_2O$) was used in place of Rongalite C. There was likewise obtained an electrically conducting fiber of the same nature as the fiber obtained in Example 1.

EXAMPLE 3

Kanekalon S (modacrylic fiber, 2 deniers, 51 millimeters in length of cut, made by Kanegafuchi Chemical Co., Ltd., Japan) was heat-treated in a bath containing 30 wt. % of cupric sulfate and 15 wt. % of hydroxylamine sulfate in relation to the weight of fiber in the bath. The ratio of the fiber weight to the water weight containing the chemicals was 1:15. The heat-treatment was at a temperature of 100° C. for 90 minutes. Next, the fiber was thoroughly washed in water. Then the washed fiber was again heat-treated in an aqueous solution containing 10 grams of dithionous acid and 2 grams of sodium acetate in relation to 1 liter of water, at a temperature of 90° C. for 60 minutes. The electrically conducting fiber obtained after being thoroughly washed in water and dried had an olive-grey color and contained 10.8% by weight copper sulfide in relation to the weight of the starting fiber. Its electrical resistivity was 0.86 ohm·centimeter.

When this electrically conducting fiber was subjected to the repeated washing test ten times as in Example 1, deterioration of its conductivity was hardly perceived.

Further, this electrically conducting fiber was treated in an aqueous solution containing 2 wt. % of Diacryl Brilliant Blue $H_2$R-N (cationic dye, made by Mitsubishi Chemical Industry Co., Ltd., Japan) in relation to the fiber weight at a temperature of 100° C. for 60 minutes. The electrically conducting fiber was splendidly dyed a dark-blue color.

EXAMPLES 4–7

The procedure of Example 3 is repeated except instead of dithionous acid either sodium dithionite, sodium thiosulfate, sodium hydrogen sulfite, or sodium pyrosulfite is used. In each case, there was obtained an electrically conducting fiber of the same nature as the fiber obtained in Example 3.

EXAMPLE 8

Toraylon (acrylic fiber, 3 deniers, 102 millimeters in length of cut, type T-106, made by Toray Industry, Inc., Japan) was heat-treated in a bath containing 40 wt. % of cupric chloride and 20 wt. % of hydroxylamine sulfate in relation to the weight of fiber in the bath. The ratio of fiber weight to water weight containing the chemicals was 1:15. The heat-treatment was at a temperature of 100° C. for 60 minutes. Subsequently, the fiber was thoroughly washed in water. Next, the fiber thus washed was again heat-treated in an aqueous solution containing 15 grams of sodium sulfide and 4 milliliters of sulfuric acid in relation to 1 liter of water, at a temperature of 90° C. for 60 minutes. The electrically conducting fiber obtained after being thoroughly washed in water and dried had an olive-grey color and contained 15.1% by weight copper sulfide in relation to the weight of the starting fiber. Its electrical resistivity was 0.060 ohm·centimeter.

When this electrically conducting fiber was subjected to the repeated washing test ten times as in Example 1, deterioration of its conductivity was negligible.

Further, this electrically conducting fiber was treated in an aqueous solution containing 4 wt. % of Diacryl Navy Blue RL-N (cationic dye, made by Mitsubishi Chemical Industry Co., Ltd., Japan) in relation to the fiber weight, at a temperature of 100° C. for 60 minutes. Electrically conducting fiber dyed finely in a dark-blue color was obtained.

EXAMPLE 9

Cashmilon (acrylic fiber, 2 deniers, 51 millimeters in length of cut, made by Asahi Chemical Industry Co., Ltd., Japan) which was treated to adsorb monovalent copper ions through the same treatment as in Example 1 was put into a closed receptacle having a gas inlet.

Sulfur dioxide was fed into the receptacle until the pressure in the interior thereof reached 0.5 kg/cm$^2$ gauge pressure. Then, saturated vapor at 105° C. was fed into the receptacle until the pressure within the receptacle reached 1.0 kg/cm$^2$ gauge pressure. After having shut the receptacle tightly, the fiber was caused to react therein. It was taken out after cooling, washed thoroughly in water, and dried. The electrically conducting fiber thus obtained has an olive-grey color. Its electrical resistivity was 0.50 ohm·centimeter.

The electrically conducting fiber was tested for washability and dyeability by cationic dyestuffs. The results were as good as in the case of Examples 1 to 8.

EXAMPLE 10

Example 9 was repeated except hydrogen sulfide was used instead of sulfur dioxide. An electrically conducting fiber of the same nature as the fiber obtained in Example 9 was obtained.

We claim:

1. An electrically conducting fiber consisting essentially of an acrylic or modacrylic fiber which is impregnated with copper sulfide.

2. An electrically conducting fiber as claimed in claim 1 wherein the weight percentage of copper sulfide expressed in terms of the weight of metallic copper is about 1% to about 30% based upon the weight of the starting fiber.

3. An electrically conducting fiber as claimed in claim 1 or 2 wherein said copper sulfide is cupric sulfide.

4. An electrically conducting fiber as claimed in claim 1 or 2 wherein said copper sulfide is cuprous sulfide.

5. An electrically conducting fiber as claimed in claim 1 or 2 wherein said copper sulfide is in the form of digenite which is adsorbed within the fiber.

6. An electrically conducting fiber as claimed in claim 1 or 2 which is dyed with a cationic dye.

7. An electrically conducting fiber as claimed in claim 1 or 2 wherein the electrical conductivity is imparted to said fiber by converting monovalent copper ions adsorbed within the fiber to said copper sulfide.

8. An electrically conducting fiber as claimed in claim 7 wherein the monovalent copper ions are adsorbed within the fiber by heat-treating it in a bath containing a copper compound and a reducing agent.

9. An electrically conducting fiber as claimed in claim 7 wherein the adsorbed monovalent copper ions are converted to copper sulfide by heat-treating the fiber having adsorbed monovalent copper ions in the presence of a sulfur-containing compound.

10. An electrically conducting fiber as claimed in claim 8 wherein the adsorbed monovalent copper ions are converted to copper sulfide by heat-treating the fiber having adsorbed monovalent copper ions in the presence of a sulfur-containing compound.

11. An electrically conducting fiber as claimed in claim 7 wherein the fiber having adsorbed monovalent copper ions is washed prior to converting the adsorbed monovalent copper ions to copper sulfide.

12. An electrically conducting fiber as claimed in claim 8 wherein the fiber having adsorbed monovalent copper ions is washed prior to converting the adsorbed monovalent copper ions to copper sulfide.

* * * * *